UNITED STATES PATENT OFFICE.

EUGEN ANDERWERT, HERMANN FRITZSCHE, AND HEINRICH SCHOBEL, OF BASEL, SWITZERLAND, ASSIGNORS TO SOCIETY OF CHEMICAL INDUSTRY IN BASLE, OF BASEL, SWITZERLAND.

SUBSTANTIVE ORTHOOXYAZO DYESTUFFS AND A PROCESS OF MAKING SAME.

1,265,030. Specification of Letters Patent. Patented May 7, 1918.

No Drawing. Original application filed October 6, 1915, Serial No. 54,403. Divided and this application filed January 24, 1917. Serial No. 144,242.

*To all whom it may concern:*

Be it known that we, EUGEN ANDERWERT, HERMANN FRITZSCHE, and HEINRICH SCHOBEL, all three chemists and citizens of the Swiss Republic, and residents of Basel, Switzerland, have invented new Substantive Orthooxyazo Dyestuffs and a Process of Making Same, of which the following is a full, clear, and exact specification.

This application is a divisional one of our application for Letters Patent Ser. No. 54403, filed October 6, 1915.

Orthoaminophenol and its derivatives have been employed hitherto exclusively for the manufacture of orthooxyazodyestuffs dyeing mordanted wool, and never for the manufacture of substantive dyestuffs dyeing unmordanted cotton. We have now found that the azodyestuffs containing a diazoderivative of orthoaminophenol or of one of its derivatives on the one hand and the diazoderivative of a 2:5:7-aminonaphtholsulfonic or 2:5:1:7-aminonaphtholdisulfonic compound in the middle position on the other hand have the property of substantive azodyestuffs, that is to dye cotton and other fibers without mordant.

Besides the 2:5:7-aminonaphtholmonosulfonic or 2:5:1:7-aminonaphtholdisulfonic acid one of the following derivatives of 2:5:7-aminonaphtholmonosulfonic acid can be employed:

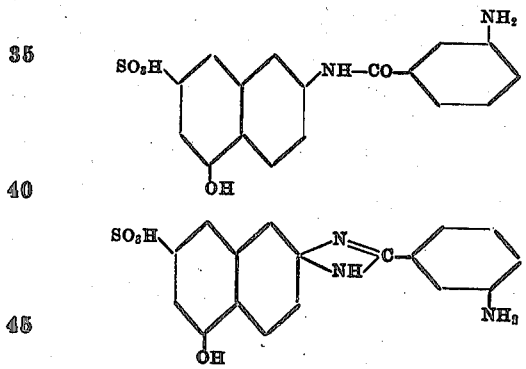

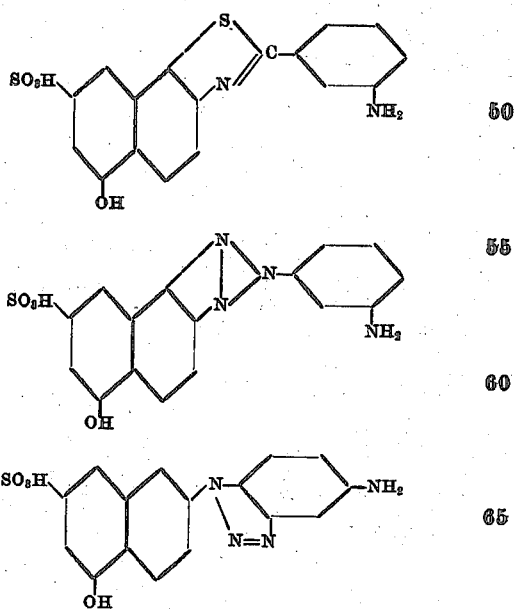

or one of the corresponding derivatives of the 2:5:1:7-aminonaphtholdisulfonic acid.

The new orthooxyazodyestuffs derived from these 2:5:7-aminonaphtholsulfonic or 2:5:1:7-aminonaphtholdisulfonic compounds constitute intense colored powders, yielding with concentrated sulfuric acid deep colored solutions and dissolving in water to solutions changing intensively their colorations on addition of sodium carbonate or of soda lye and dyeing cotton, wool, silk, mixed goods, straw, wood and paper according to the methods used for the substantive dyestuffs.

The invention is illustrated by the following examples:

Example 1: The diazoderivative of 15.4 kg. 5:2:1-nitroaminophenol is added to a solution of 24 kg. 2:5:7-aminonaphtholsulfonic acid and 30 kg. sodium carbonate in water. The combination achieved, the mass is acidulated with hydrochloric acid till it shows with kongo an acid reaction and further diazotized by adding 30 kg. hydrochloric acid and a solution of 7.2 kg. sodium nitrite. After stirring for 1 hour, the diazocompound is poured into a solution of 33 kg. 1:8:3:6-aminonaphtholdisulfonic acid and of 40 kg. soda. The isolation of the dyestuff is effected in the usual way. It dyes cotton reddish-blue tints and dissolves in water to a blue solution.

Example 2: 16.8 kg. nitroaminoparacresol are diazotized and combined with a solution of 35.5 kg.

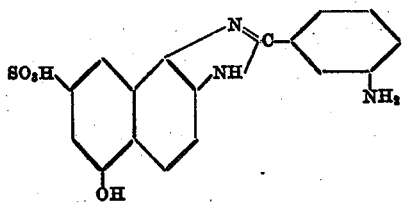

and of 30 kg. sodium carbonate in water. The following day the monoazodyestuff is acidulated and further diazotized by adding a solution of 7.2 kg. sodium nitrite. The final combination is effected by pouring the diazocompound into a solution of 26 kg. 1:4-naphtholsulfonic acid and of 40 kg. sodium carbonate in water. The dyestuff isolated by addition of common salt dyes cotton brown-red shades and dissolves in water with a red coloration turning to brownish-red on addition of NaOH.

The new dyestuffs are not only suitable for dyeing cotton, wool, silk, leather, straw, wood, paper, mixed goods, etc., like the known substantive dyestuffs, but also for the production of lakes and as parent materials for the production of valuable new derivatives.

What we claim is:

1. The described process for the manufacture of new substantive orthooxyazodyestuffs consisting in combining an aromatic orthooxydiazobody with a 2:5:7-aminonaphtholsulfonic compound, diazotizing the resulting oxyazodyestuff and combining the thus obtained diazoazocompound with a naphthol compound.

2. The described process for the manufacture of new substantive orthooxyazodyestuffs consisting in combining an aromatic orthooxydiazobody with a 2:5:1:7-aminonaphtholdisulfonic compound, diazotizing the resulting oxyazodyestuff and combining the thus obtained diazoazocompound with a naphthol compound.

3. As new products the described orthooxyazodyestuffs containing the diazoderivative of a 2:5:7-aminonaphtholsulfonic compound coupled on the one hand with an aromatic orthooxydiazobody and on the other hand with a naphthol compound and constituting intense colored powders yielding with concentrated sulfuric acid deep colored solutions and dissolving in water to solutions changing their coloration on addition of sodium carbonate or of soda lye and dyeing cotton, wool, silk, mixed goods, straw, wood and paper various tints according to the methods used for the known substantive dyestuffs.

4. As new products the described orthooxyazodyestuffs containing the diazoderivative of a 2:5:1:7-aminonaphtholdisulfonic compound coupled on the one hand with an aromatic orthooxydiazobody and on the other hand with a naphthol compound and constituting intense colored powders yielding with concentrated sulfuric acid deep colored solutions and dissolving in water to solutions changing their coloration on addition of sodium carbonate or of soda lye and dyeing cotton, wool, silk, mixed goods, straw, wood and paper various tints according to the methods used for the known substantive dyestuffs.

In witness whereof we have hereunto signed our names this 23rd day of December 1916, in the presence of two subscribing witnesses.

EUGEN ANDERWERT.
HERMANN FRITZSCHE.
HEINRICH SCHOBEL.

Witnesses:
CARL O. SPAMER,
AMAND RITTER.